M. J. B. BARBAROU.
PEDAL DEVICE FOR MOTOR VEHICLES.
APPLICATION FILED SEPT. 21, 1920.
1,438,288.
Patented Dec. 12, 1922.
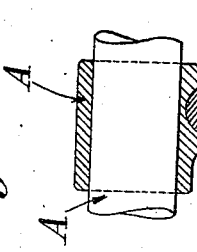
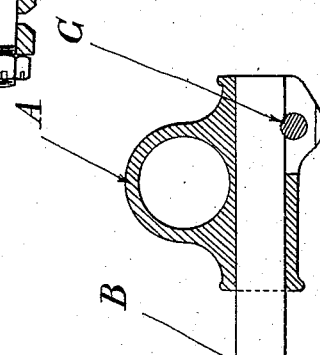
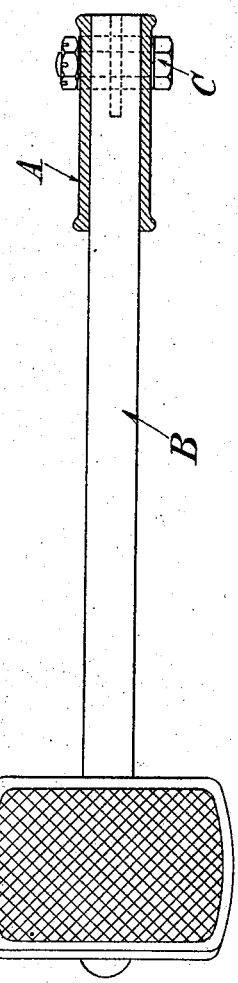
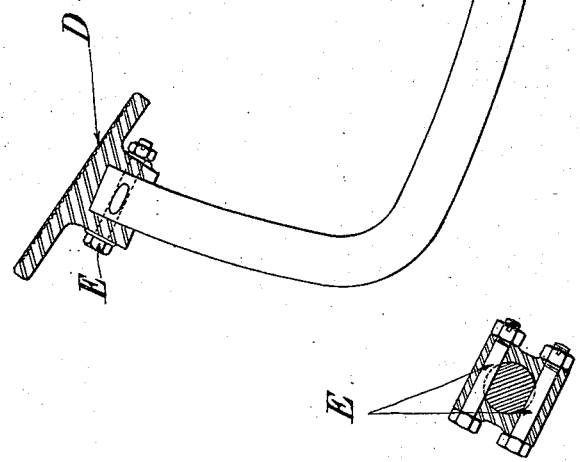
INVENTOR.
Marius Jean Baptiste Barbarou.
By
his ATTORNEY.

Patented Dec. 12, 1922.

1,438,288

UNITED STATES PATENT OFFICE.

MARIUS JEAN BAPTISTE BARBAROU, OF PARIS, FRANCE.

PEDAL DEVICE FOR MOTOR VEHICLES.

Application filed September 21, 1920. Serial No. 411,831.

*To all whom it may concern:*

Be it known that I, MARIUS JEAN BAPTISTE BARBAROU, a citizen of the French Republic, residing at Paris, in the Republic of France, have invented new and useful Improvements in Pedal Devices for Motor Vehicles, of which the following is a specification.

This invention relates to a method of construction for pedals employed in motor vehicles. This method of construction permits the rapid execution of machine work upon the different elements which constitute the pedal device, this latter being shown by way of example in the accompanying drawings.

Figure 1 shows a side view of the complete pedal device, the hub thereof being represented in section.

Figure 2 is a section of the hub on a plane perpendicular to that of Fig. 1.

Figure 3 is a sectional view illustrating the method of securing the pedal plate to the arm.

Figure 4 is a plan view.

The pedal device is essentially constituted by the hub A which is pivoted to the shaft A' with an easy friction fit, or is keyed thereto, according to the method proposed for operating the device. The said hub may be constructed by the stamping or the casting process. It is provided with a cylindrical aperture having engaged therein the arm of the pedal, B, this consisting simply of a rolled steel bar which is cut to suitable length and bent into the proper shape. The bar B is secured within the hub by means of the bolt C which clamps the said bar by means of the two jaws of the hub and also acts to prevent any longitudinal movement of the bar by reason of the penetration of the said bolt below the surface of the bar, as is shown in the drawing.

At the other end of the bar which thus constitutes the arm or main body of the pedal is mounted the pedal plate D which is provided with a projecting portion or boss containing a recess having engaging therein the arm of the pedal, the connection being completed by the two bolts E which enter partially into either side of the rod in such manner that the pedal plate is prevented from rotating or from overturning upon the arm of the pedal.

The pedal device can be readily taken apart, all that is necessary being to remove the bolt C whereby the pedal plate and the rod can be dismounted, and on the other hand to remove the two bolts E for separating the pedal plate from the rod.

Having now described my invention, what I claim as new and desire to secure by Letters Patent is:

1. A pedal device for motor vehicles, comprising a pedal rod, and a hub having openings therethrough substantially at right angles to each other, one of said openings adapted to receive one end of said rod and the other opening adapted to receive the vehicle shaft.

2. A pedal device for motor vehicles, comprising a bent rod, a pedal plate disposed upon one end of the said rod, the other end of said rod being provided with a split hub mounted loosely or keyed upon the transmission shaft, and a bolt disposed in the said hub for clamping the same upon the said rod, this latter being provided with a recess cooperating with the said bolt.

3. A pedal device for motor vehicles, comprising a bent rod, a hub for the transmission shaft disposed upon one end of said rod, the other end of the rod carrying a pedal plate provided with a boss, the said boss being provided with a recess and with clamping bolts, the said rod containing recesses cooperating with the said bolts.

4. A pedal device for motor vehicles, comprising a pedal rod carrying a pedal at one end thereof, a hub having openings therethrough substantially at right angles to each other, one of said openings adapted to receive the end of the pedal rod opposite the one carrying the pedal, and means passing through said hub at one side of the plane of said rod to retain the latter in the hub.

In testimony whereof I have signed my name to this specification.

MARIUS JEAN BAPTISTE BARBAROU.